United States Patent
Strelow et al.

(10) Patent No.: US 8,315,794 B1
(45) Date of Patent: Nov. 20, 2012

(54) METHOD AND SYSTEM FOR GPS-DENIED NAVIGATION OF UNMANNED AERIAL VEHICLES

(75) Inventors: Dennis W. Strelow, Sunnyvale, CA (US); Alan B. Touchberry, St. Louis Park, MN (US)

(73) Assignee: Honeywell International Inc., Morristown, NJ (US)

(*) Notice: Subject to any disclaimer, the term of this patent is extended or adjusted under 35 U.S.C. 154(b) by 1535 days.

(21) Appl. No.: 11/470,152

(22) Filed: Sep. 5, 2006

(51) Int. Cl.
*G01C 21/00* (2006.01)
*G05D 3/00* (2006.01)

(52) U.S. Cl. .................. 701/412; 701/2; 701/3; 701/23; 701/468

(58) Field of Classification Search .................... 701/24, 701/3, 4; 382/154, 294, 173
See application file for complete search history.

(56) References Cited

U.S. PATENT DOCUMENTS

| | | | |
|---|---|---|---|
| 4,179,693 A | 12/1979 | Evans et al. | |
| 4,686,474 A * | 8/1987 | Olsen et al. | 324/331 |
| 5,878,356 A | 3/1999 | Garrot, Jr. et al. | |
| 6,173,087 B1 * | 1/2001 | Kumar et al. | 382/284 |
| 6,388,611 B1 * | 5/2002 | Dillman | 342/357.31 |
| 6,928,194 B2 * | 8/2005 | Mai et al. | 382/284 |
| 7,127,348 B2 | 10/2006 | Smitherman et al. | |
| 7,143,130 B2 | 11/2006 | Lin | |
| 7,191,056 B2 | 3/2007 | Costello et al. | |
| 7,228,230 B2 | 6/2007 | Hirokawa | |
| 7,321,386 B2 * | 1/2008 | Mittal et al. | 348/169 |
| 7,418,320 B1 * | 8/2008 | Bodin et al. | 701/26 |
| 7,469,183 B2 * | 12/2008 | Bodin et al. | 701/23 |
| 7,546,187 B2 * | 6/2009 | Bodin et al. | 701/26 |
| 2003/0081827 A1 * | 5/2003 | Paz-Pujalt et al. | 382/152 |
| 2004/0039497 A1 * | 2/2004 | Wood et al. | 701/4 |
| 2005/0271300 A1 * | 12/2005 | Pina | 382/294 |
| 2006/0167596 A1 * | 7/2006 | Bodin et al. | 701/3 |
| 2006/0167622 A1 * | 7/2006 | Bodin et al. | 701/206 |
| 2008/0228335 A1 * | 9/2008 | Bodin et al. | 701/26 |
| 2008/0243372 A1 * | 10/2008 | Bodin et al. | 701/206 |

FOREIGN PATENT DOCUMENTS

EP 1677076 7/2006

OTHER PUBLICATIONS

D. Strelow and S. Singh, "Online Motion Estimation from Image and Inertial Measurements", Workshop on Integration of Vision and Inertial Sensors (INERVIS 2003), Coimbra, Portugal, Jun. 2003.
Dennis Strelow and Sanjiv Singh, "Reckless motion estimation from omnidirectional image and inertial measurements", IEEE Workshop on Omnidirectional Vision and Camera Networks (OMNIVIS 2003), Madison, WI, Jun. 2003.

* cited by examiner

*Primary Examiner* — Ian Jen
(74) *Attorney, Agent, or Firm* — Fogg & Powers LLC

(57) ABSTRACT

A method and system for navigation of one or more unmanned aerial vehicles in an urban environment is provided. The method comprises flying at least one Global Positioning System (GPS)-aided unmanned aerial vehicle at a first altitude over an urban environment, and flying at least one GPS-denied unmanned aerial vehicle at a second altitude over the urban environment that is lower than the first altitude. The unmanned aerial vehicles are in operative communication with each other so that images can be transmitted therebetween. A first set of images from the GPS-aided unmanned aerial vehicle is captured, and a second set of images from the GPS-denied unmanned aerial vehicle is also captured. Image features from the second set of images are then matched with corresponding image features from the first set of images. A current position of the GPS-denied unmanned aerial vehicle is calculated based on the matched image features from the first and second sets of images.

20 Claims, 2 Drawing Sheets

METHOD AND SYSTEM FOR GPS-DENIED NAVIGATION OF UNMANNED AERIAL VEHICLES

The present application is related to U.S. patent application Ser. No. 11/470,134, which is incorporated herein by reference.

BACKGROUND

Unmanned aerial vehicles (UAVs) are remotely piloted or self-piloted aircraft that can carry sensors, communications equipment, or other payloads. They have been used in a reconnaissance and intelligence-gathering role for many years. More recently, UAVs have been developed for the purpose of surveillance and target tracking Autonomous surveillance and target tracking performed by UAVs in either military or civilian environments is becoming an important aspect of intelligence-gathering methods.

Typically, UAVs use the Global Positioning System (GPS) to provide navigation over various terrains. In many scenarios, UAVs are required to fly in an urban environment, which often have an urban canyon effect. An "urban canyon" is an artifact of an urban environment similar to a natural canyon. The urban canyon is caused by streets cutting through dense blocks of high rise buildings such as skyscrapers. It is known that the urban canyon can cause problems in reception of GPS signals.

For example, GPS receivers can suffer from multipath errors which are caused from receiving a composite of direct GPS signals and reflected GPS signals from nearby objects such as buildings. In an urban canyon, a direct line of sight (LOS) GPS signal can be completely blocked by a building structure and a reflected signal can reach the receiver, resulting in position and velocity errors of significant magnitudes. Thus, when UAVs operate in an urban environment, access to the GPS signals needed to navigate without drift is often denied by the urban canyon.

Many methods have been proposed for using image-aided navigation of autonomous vehicles such as UAVs. For example, matching or referencing a GPS-denied vehicle's current image of terrain to a satellite image of the same terrain has been suggested. However, these methods lack the temporal and spatial proximity needed in order to use the images for UAV navigation in an urban canyon.

SUMMARY

The present invention is related to a method and system for navigation of one or more unmanned aerial vehicles in an urban environment. The method comprises flying at least one Global Positioning System (GPS)-aided unmanned aerial vehicle at a first altitude over an urban environment, and flying at least one GPS-denied unmanned aerial vehicle at a second altitude over the urban environment that is lower than the first altitude. The unmanned aerial vehicles are in operative communication with each other so that images can be transmitted therebetween. A first set of images from the GPS-aided unmanned aerial vehicle is captured, and a second set of images from the GPS-denied unmanned aerial vehicle is also captured. Image features from the second set of images are then matched with corresponding image features from the first set of images. A current position of the GPS-denied unmanned aerial vehicle is calculated based on the matched image features from the first and second sets of images.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a method and system for GPS-denied navigation using a hierarchy of unmanned aerial vehicles (UAVs), which is particularly useful in an urban environment. In one approach of the present invention, UAVs flying simultaneously at different altitudes communicate their respective images to each other, with a lower altitude GPS-denied UAV registering or matching its images to those of a higher altitude GPS-aided UAV. If the image correspondences are automatically established, then the lower altitude UAV can determine its attitude to about the same accuracy as the GPS-aided UAV.

In another approach, images from higher altitude GPS-aided UAVs can be used on-the-fly for planning the path of lower altitude UAVs, and for bringing the lowest-attitude UAV to the desired target location in the shortest possible time.

Figure 1:
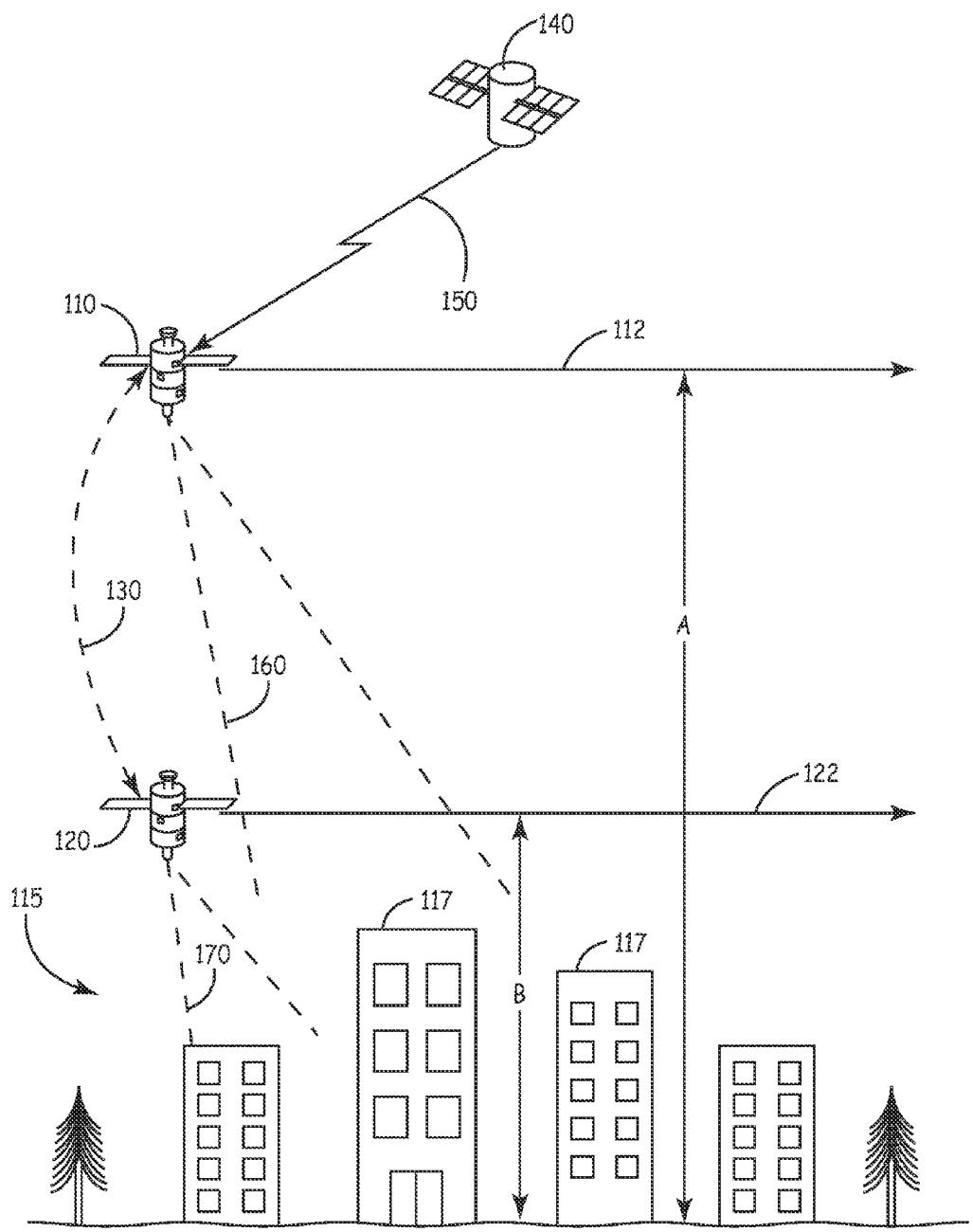
FIG. 1 is a schematic diagram depicting a method for navigation of a GPS-denied unmanned aerial vehicle in an urban environment.

FIG. 1 is a schematic diagram depicting a method for navigation of a GPS-denied UAV in an urban environment according to one approach of the invention. A GPS-aided UAV 110 travels along a first path 112 at a first altitude A over an urban environment 115 having various buildings 117. A GPS-denied UAV 120 travels along a second path 122 at a second altitude B that is lower than the first altitude A. The UAVs 110 and 120 are in operative communication with each other so that image signals 130 can be transmitted therebetween.

The UAVs 110 and 120 can be hover-capable aerial vehicles or fixed-wing aerial vehicles. One or more image sensors such as a camera can be used by UAVs 110 and 120, which provide a means for capturing images during flight. Additional sensors that can be used by the UAVs include one or more GPS sensors for obtaining GPS measurements; inertial sensors such as accelerometers or gyroscopes; a radar sensor (e.g., Doppler radar for velocity measurements); and laser detection and ranging (LADAR) or acoustic sensors (for distance measurements). Various combinations of any of the above sensors may also be employed in the UAVs.

A GPS satellite 140 transmits GPS signals 150 to a GPS sensor such as a receiver carried onboard UAV 120. An image sensor such as a camera onboard UAV 110 captures a first set of images within a field-of-view (FOV) 160 of the camera. Likewise, an image sensor such as a camera onboard UAV 120 captures a second set of images within a FOV 170 of the camera. Image features from the second set of images are then matched with corresponding image features from the first set of images. A current position of UAV 120 is calculated based on the matched image features from the first and second sets of images. This aids in the navigation of UAV 120 flying at the lower altitude, since urban environment 115 can interfere with GPS signals 150 because of the urban canyon effect.

Although two UAVs are shown in FIG. 1, it should be understood that additional UAVs can be employed to implement the method of the invention as desired.

Using images from collaborating UAVs at different altitudes rather than satellite images has the advantage of spatial and temporal proximity between images from the higher and lower altitude UAVs. This is an important advantage in automatically establishing correspondences between the images.

Figure 2:
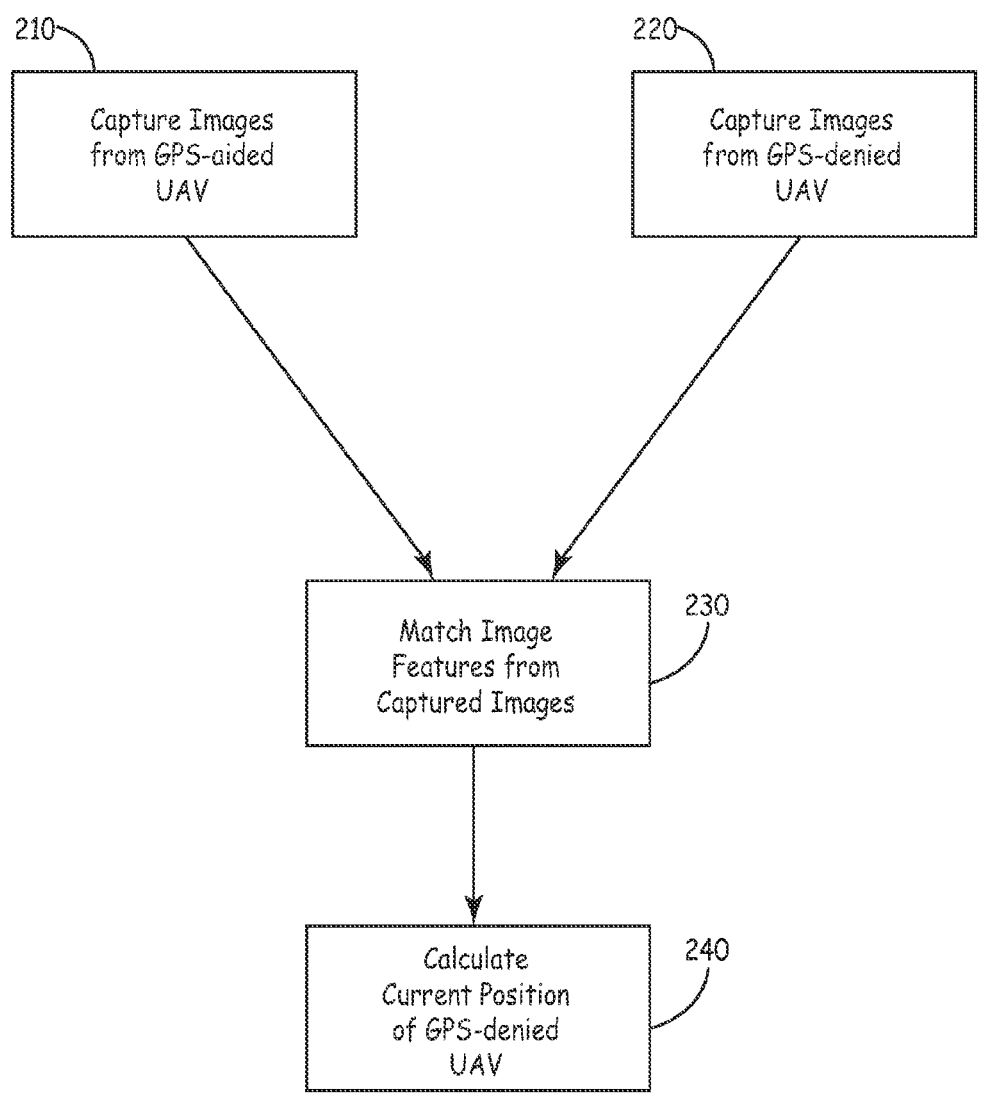
FIG. 2 is a processing flow diagram of a method for navigation of a GPS-denied unmanned aerial vehicle in an urban environment.

FIG. 2 is a processing flow diagram of the method for navigation of a GPS-denied UAV in an urban environment. As discussed above, a first set of images is captured from a GPS-aided UAV (block 210) flying at a first altitude over an urban environment. A second set of images is captured from a GPS-denied UAV (block 220) at a second altitude over the urban environment that is lower than the first altitude. Image features from the second set of images are matched with corresponding image features from the first set of images (block 230). A current position of the GPS-denied UAV is calculated (block 240) based on the matched image features from the first and second sets of images.

The present method automatically establishes the correspondences between images of the different altitude UAVs. A combination of the inertial position estimate of the low-altitude UAV, salient feature detection, and epipolar constraints between images can be used to correctly establish these correspondences. The salient feature detection can be carried out by cueing based on salient image features to detect matches between the second set of images and the first set of images. A variety of salient image feature types can be considered depending on the exact scenario.

The present method can be implemented by utilizing computer hardware and/or software, which provide a means for matching image features from the second set of images with corresponding image features from the first set of images; and means for calculating a current position of the GPS-denied UAV based on the matched image features from the first and second sets of images.

Instructions for carrying out the various process tasks, calculations, control functions, and the generation of signals and other data used in the operation of the method and systems described herein can be implemented in software, firmware, or other computer readable instructions. These instructions are typically stored on any appropriate computer readable media used for storage of computer readable instructions or data structures. Such computer readable media can be any available media that can be accessed by a general purpose or special purpose computer or processor, or any programmable logic device.

Suitable computer readable media may comprise, for example, non-volatile memory devices including semiconductor memory devices such as EPROM, EEPROM, or flash memory devices; magnetic disks such as internal hard disks or removable disks; magneto-optical disks; CDs, DVDs, or other optical storage disks; nonvolatile ROM, RAM, and other like media. Any of the foregoing may be supplemented by, or incorporated in, specially-designed application-specific integrated circuits (ASICs). When information is transferred or provided over a network or another communications connection (either hardwired, wireless, or a combination of hardwired or wireless) to a computer, the computer properly views the connection as a computer readable medium. Thus, any such connection is properly termed a computer readable medium. Combinations of the above are also included within the scope of computer readable media.

The method of the invention can be implemented in computer readable instructions, such as program modules or applications, which are executed by a data processor. Generally, program modules or applications include routines, programs, objects, data components, data structures, algorithms, etc. that perform particular tasks or implement particular abstract data types. These represent examples of program code means for executing steps of the method disclosed herein. The particular sequence of such executable instructions or associated data structures represents examples of corresponding acts for implementing the functions described in such steps.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A method for navigation of one or more unmanned aerial vehicles in an urban environment, the method comprising:
   flying a first unmanned aerial vehicle at a first altitude over an urban environment such that the first unmanned aerial vehicle is aided by Global Positioning System (GPS) signals;
   flying a second unmanned aerial vehicle at a second altitude over the urban environment that is lower than the first altitude such that the second unmanned aerial vehicle is denied access to GPS signals, wherein the first and second unmanned aerial vehicles are in operative communication with each other so that images can be transmitted therebetween;
   capturing a first set of images of a selected area in the urban environment from the first unmanned aerial vehicle, the first set of images having one or more image features;
   capturing a second set of images of the selected area in the urban environment from the second unmanned aerial vehicle, the second set of images having one or more image features that correspond to the one or more image features in the first set of images;
   matching the one or more image features from the second set of images with corresponding image features from the first set of images; and
   calculating a current position of the second unmanned aerial vehicle based on the matched image features from the first and second sets of images.

2. The method of claim 1, wherein the first set of images is captured by one or more cameras on the first unmanned aerial vehicle.

3. The method of claim 1, wherein the second set of images is captured by one or more cameras on the second unmanned aerial vehicle.

4. The method of claim 1, wherein the image features from the second set of images are matched with image features from the first set of images by a method comprising:
   estimating inertial position of the second unmanned aerial vehicle;
   cueing based on salient image features to detect matches between the second set of images and the first set of images; and
   providing epipolar constraints between images to correctly establish image correspondences.

5. The method of claim 4, wherein the inertial position is estimated based on input from one or more inertial sensors on the second unmanned aerial vehicle.

6. The method of claim 5, wherein the inertial sensors comprise one or more gyroscopes, accelerometers, or combinations thereof.

7. The method of claim 1, wherein the urban environment has an urban canyon.

8. The method of claim 1, wherein the first unmanned aerial vehicle comprises a hover-capable aerial vehicle or a fixed-wing aerial vehicle.

9. The method of claim 1, wherein the second unmanned aerial vehicle comprises a hover-capable aerial vehicle or a fixed-wing aerial vehicle.

10. A system for navigation of one or more unmanned aerial vehicles in an urban environment, the system comprising:
    means for capturing a first set of images of a selected area in an urban environment from a GPS-aided first unmanned aerial vehicle flying at a first altitude over the urban environment, the first set of images having one or more image features;
    means for capturing a second set of images of the selected area in the urban environment from a second unmanned aerial vehicle at a second altitude over the urban environment that is lower than the first altitude such that the second unmanned aerial vehicle is denied access to GPS signals, the second set of images having one or more image features that correspond to the one or more image features in the first set of images, wherein the first and second unmanned aerial vehicles are in operative communication with each other so that images can be transmitted therebetween;
    means for matching the one or more image features from the second set of images with corresponding image features from the first set of images; and
    means for calculating a current position of the second unmanned aerial vehicle based on the matched image features from the first and second sets of images.

11. The system of claim 10, wherein the means for capturing the first set of images comprises one or more cameras on the GPS-aided first unmanned aerial vehicle.

12. The system of claim 10, wherein the means for capturing the second set of images comprises one or more cameras on the second unmanned aerial vehicle.

13. The system of claim 10, further comprising one or more inertial sensors on the second unmanned aerial vehicle.

14. The system of claim 13, wherein the inertial sensors comprise one or more gyros, accelerometers, or combinations thereof.

15. The system of claim 10, further comprising one or more GPS sensors on the unmanned aerial vehicles.

16. The system of claim 10, wherein the GPS-aided first unmanned aerial vehicle comprises a hover-capable aerial vehicle or a fixed-wing aerial vehicle.

17. The system of claim 10, wherein the second unmanned aerial vehicle comprises a hover-capable aerial vehicle or a fixed-wing aerial vehicle.

18. A non-transitory computer readable medium having instructions stored thereon for a method of navigation of one or more unmanned aerial vehicles in an urban environment, the method comprising:
    capturing a first set of images of a selected area in an urban environment from a GPS-aided first unmanned aerial vehicle flying at a first altitude over the urban environment, the first set of images having one or more image features;
    capturing a second set of images of the selected area in the urban environment from a second unmanned aerial vehicle at a second altitude over the urban environment that is lower than the first altitude such that the second unmanned aerial vehicle is denied access to GPS signals, the second set of images having one or more image features that correspond to the one or more image features in the first set of images, wherein the first and second unmanned aerial vehicles are in operative communication with each other so that images can be transmitted therebetween;
    matching the one or more image features from the second set of images with corresponding image features from the first set of images; and
    calculating a current position of the second unmanned aerial vehicle based on the matched image features from the first and second sets of images.

19. The non-transitory computer readable medium of claim 18, wherein the image features from the second set of images are matched with image features from the first set of images by a method comprising:
    estimating inertial position of the second unmanned aerial vehicle;
    cueing based on salient image features to detect matches between the second set of images and the first set of images; and
    providing epipolar constraints between images to correctly establish image correspondences.

20. A non-transitory computer readable medium having instructions stored thereon for a method of navigation of one or more unmanned aerial vehicles in an urban environment according to claim 1.

\* \* \* \* \*